United States Patent
Kim et al.

(10) Patent No.: US 9,635,368 B2
(45) Date of Patent: Apr. 25, 2017

(54) METHOD AND APPARATUS FOR DECODING A VIDEO SIGNAL

(71) Applicant: LG Electronics Inc., Seoul (KR)

(72) Inventors: Jung Sun Kim, Seoul (KR); Seung Wook Park, Seoul (KR); Young Hee Choi, Seoul (KR); Jae Won Sung, Seoul (KR); Byeong Moon Jeon, Seoul (KR); Joon Young Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/711,129

(22) Filed: May 13, 2015

(65) Prior Publication Data

US 2015/0249840 A1    Sep. 3, 2015

Related U.S. Application Data

(63) Continuation-in-part of application No. 13/376,503, filed as application No. PCT/KR2010/003639 on Jun. 7, 2010, now Pat. No. 9,100,648.

(Continued)

(30) Foreign Application Priority Data

Jun. 7, 2010   (KR) .................. 10-2010-0053253

(51) Int. Cl.
*H04N 19/645* (2014.01)
*H04N 19/149* (2014.01)
(Continued)

(52) U.S. Cl.
CPC ......... *H04N 19/149* (2014.11); *H04N 19/129* (2014.11); *H04N 19/18* (2014.11); *H04N 19/625* (2014.11)

(58) Field of Classification Search
CPC .................................................. H04N 7/26095
See application file for complete search history.

(56) References Cited

U.S. PATENT DOCUMENTS 5,241,395 A * 8/1993 Chen .................... H04N 19/176
358/426.14
5,986,709 A    11/1999 Lee
(Continued)

FOREIGN PATENT DOCUMENTS

EP    1370087 A1    12/2003
KR    10-2001-0069018 A    7/2001
(Continued)

OTHER PUBLICATIONS

U.S. Office Action dated Apr. 4, 2013 for U.S. Appl. No. 12/540,208, 9 pages.
(Continued)

*Primary Examiner* — Dave Czekaj
*Assistant Examiner* — Berteau Joisil
(74) *Attorney, Agent, or Firm* — Dentons US LLP

(57) ABSTRACT

The present invention relates to a method for decoding a video signal, comprising the steps of: acquiring a transform size flag of the current macroblock from a video signal; checking the number of non-zero transform coefficients at each pixel position in a first transform block which corresponds to the transform size flag; changing a scan order of the first transform block by prioritizing the position of the pixel having the greatest number of the non-zero transform coefficients in the first transform block; determining the number of the non-zero transform coefficients at each pixel position in a second transform block, and setting the changed scan order of the first transform block as an initialized scan order of the second transform block; adding the number of the non-zero transform coefficients at each pixel position in the first transform block and the number of (Continued)

the non-zero transform coefficients at each pixel position in the second transform block, and changing the scan order of the second transform block by prioritizing the position of the pixel having the greatest number of the non-zero transform coefficients; and decoding the transform coefficients arranged in the scan order changed in the previous step, wherein the first transform block and the second transform block have sizes corresponding to the transform size flag, and are contained in the current macroblock.

10 Claims, 10 Drawing Sheets

Related U.S. Application Data

(60) Provisional application No. 61/184,834, filed on Jun. 7, 2009, provisional application No. 61/257,844, filed on Nov. 4, 2009, provisional application No. 61/288,323, filed on Dec. 20, 2009, provisional application No. 61/290,251, filed on Dec. 28, 2009, provisional application No. 61/290,250, filed on Dec. 28, 2009.

(51) Int. Cl.
*H04N 19/129* (2014.01)
*H04N 19/18* (2014.01)
*H04N 19/625* (2014.01)

(56) References Cited

U.S. PATENT DOCUMENTS

| | | |
|---|---|---|
| 2003/0161405 A1 | 8/2003 | Howard |
| 2003/0206582 A1 | 11/2003 | Srinivasan et al. |
| 2004/0114686 A1 | 6/2004 | Sugiyama et al. |
| 2004/0234144 A1 | 11/2004 | Sugimoto et al. |
| 2005/0249291 A1 | 11/2005 | Gordon et al. |
| 2006/0268982 A1 | 11/2006 | Lee et al. |
| 2007/0025631 A1 | 2/2007 | Kim et al. |
| 2007/0104268 A1 | 5/2007 | Seok et al. |
| 2007/0211953 A1 | 9/2007 | Sasagawa |
| 2009/0002379 A1* | 1/2009 | Baeza .................. G06T 1/20 345/522 |
| 2009/0097571 A1 | 4/2009 | Yamada et al. |
| 2010/0208827 A1 | 8/2010 | Divorra Escoda et al. |
| 2010/0246684 A1 | 9/2010 | Naito et al. |
| 2013/0051472 A1 | 2/2013 | Wiegand et al. |

FOREIGN PATENT DOCUMENTS

| | | |
|---|---|---|
| KR | 10-2002-0094823 A | 12/2002 |
| KR | 10-2006-0123939 A | 12/2006 |

OTHER PUBLICATIONS

U.S. Office Action dated Jul. 3, 2012 for U.S. Appl. No. 12/540,208, 11 pages.
PCT International Search Report dated Apr. 8, 2010 for Application No. PCT/KR2009/004498, 3 pages.
European Search Report dated May 6, 2010, for Application. No. 09010399, 7 pages.
U.S. Office Action dated Dec. 7, 2011 for U.S. Appl. No. 12/540,208, 8 pages.
Naito S. et al.; "Efficient Coding Scheme for Super High Definition Video Based on Extending H.264 High Profile" proceedings of the SPIE—The International Society for Optical Engineering, SPIE-IS &T, vol. 6077, 607727, Jan. 18, 2006, XP002538136, p. 1-8.
PCT International Search Report dated Dec. 21, 2010 for Application No. PCT/KR2010/003639, with English translation, 4 pages.
JCT-VC: "Test Model under Consideration", Joint Collaborative Team on Video Coding (JCT-VC) of ITU-T SG16 WP3 and ISO/IEC JTC1/SC29/WG11, Document: JCTVC-A205, Apr. 15-23, 2010.

\* cited by examiner

Prediction size : 16x16  Prediction size : 16x16
Transform size : 16x16  Transform size : 8x8
MDDT kernel : 1  MDDT kernel : 4

FIG. 8A

1) Block 1

<scanning order counting>　<initial scanning order>

<updated scanning order>

FIG. 8B

2) Block 2

<scanning order counting>　<initial scanning order>

<updated scanning order>

FIG. 8C

| 0 | 1 | 5 | 6 | 0 | 1 | 6 | 7 |
|---|---|---|---|---|---|---|---|
| 2 | 4 | 7 | 12 | 4 | 2 | 8 | 12 |
| 3 | 8 | 11 | 13 | 5 | 3 | 11 | 13 |
| 9 | 10 | 14 | 15 | 9 | 10 | 14 | 15 |
| 0 | 2 | 4 | 7 | | | | |
| 5 | 1 | 8 | 12 | | | | |
| 6 | 3 | 11 | 13 | | | | |
| 9 | 10 | 14 | 15 | | | | |

3) Block 3

| 3 | 2 | 2 | |
|---|---|---|---|
| | 2 | | |
| | 1 | | |
| | | | |

<scanning order counting>

| 0 | 2 | 4 | 7 |
|---|---|---|---|
| 5 | 1 | 8 | 12 |
| 6 | 3 | 11 | 13 |
| 9 | 10 | 14 | 15 |

<initial scanning order>

| 0 | 2 | 3 | 7 |
|---|---|---|---|
| 5 | 1 | 8 | 12 |
| 6 | 4 | 11 | 13 |
| 9 | 10 | 14 | 15 |

<updated scanning order>

FIG. 8D

| 0 | 1 | 5 | 6 | 0 | 1 | 6 | 7 |
|---|---|---|---|---|---|---|---|
| 2 | 4 | 7 | 12 | 4 | 2 | 8 | 12 |
| 3 | 8 | 11 | 13 | 5 | 3 | 11 | 13 |
| 9 | 10 | 14 | 15 | 9 | 10 | 14 | 15 |
| 0 | 2 | 4 | 7 | 0 | 2 | 3 | 7 |
| 5 | 1 | 8 | 12 | 5 | 1 | 8 | 12 |
| 6 | 3 | 11 | 13 | 6 | 4 | 11 | 13 |
| 9 | 10 | 14 | 15 | 9 | 10 | 14 | 15 |

4) Block 4

| 4 | 2 | 2 | |
|---|---|---|---|
| 1 | 2 | | |
| | 1 | | |
| 1 | | | |

<scanning order counting>

| 0 | 2 | 3 | 7 |
|---|---|---|---|
| 5 | 1 | 8 | 12 |
| 6 | 4 | 11 | 13 |
| 9 | 10 | 14 | 15 |

<initial scanning order>

| 0 | 2 | 3 | 8 |
|---|---|---|---|
| 5 | 1 | 9 | 12 |
| 7 | 4 | 11 | 13 |
| 6 | 10 | 14 | 15 |

<updated scanning order> though, if the spatial redundancy and the temporal
METHOD AND APPARATUS FOR DECODING A VIDEO SIGNAL This application is a divisional application of Ser. No. 13/376,503, filed Mar. 13, 2012, now allowed, which is a National Stage of International Application No. PCT/KR2010/003639, filed Jun. 7, 2010, which claims the benefit of U.S. Provisional Application No. 61/184,834, filed on Jun. 7, 2009, U.S. Provisional Application No. 61/257,844, filed on Nov. 4, 2009, U.S. Provisional Application No. 61/288,323, filed Dec. 20, 2009, U.S. Provisional Application No. 61/290,251, filed Dec. 28, 2009, and U.S. Provisional Application No. 61/290,250, filed Dec. 28, 2009, all is which are hereby incorporated by their reference. This application also claims the benefit of Korean Patent Application No. 10-2010-0053253, filed Jun. 7, 2010, which is hereby incorporated by its reference.

TECHNICAL FIELD

The present invention relates to a method and apparatus for decoding a video signal.

BACKGROUND ART

Compression coding means a series of signal processing techniques for transmitting digitalized information via a communication circuit or saving the digitalized information in a form suitable for a storage medium. As targets of compression coding, there are audio, video, characters, etc. In particular, a technique for performing compression coding on a video is called video sequence compression. A video sequence is generally characterized in having spatial redundancy and temporal redundancy.

DISCLOSURE OF THE INVENTION

Technical Problem

However, if the spatial redundancy and the temporal redundancy are not sufficiently eliminated, a compression rate may be lowered in coding a video signal. On the other hand, if the spatial redundancy and the temporal redundancy are excessively eliminated, it is unable to generate information required for decoding a video signal to degrade a decoding rate.

Technical Solution

An object of the present invention is to adaptively define a size of a unit block used for a transform process.

Another object of the present invention is to define flag information indicating a size of a unit block used for a transform process.

Another object of the present invention is to define flag information indicating a transform type.

Another object of the present invention is to use a transform scheme (e.g., DCT, KLT, etc.) suitable for a prediction mode of a macro block.

Another object of the present invention is to adaptively use a size of a unit block used for a transform process in a manner of setting the size equal to or smaller than that of a residual block.

Another object of the present invention is to use a transform kernel different for each transform block of a macro block coded by an intra prediction mode.

Another object of the present invention is to update a scanning order for each transform block of a macroblock.

A further object of the present invention is to eliminate redundancy of information indicating whether a non-zero transform coefficient level is included.

Advantageous Effects

Accordingly, the present invention defines various sizes of unit block used for a transform process, thereby improving coding efficiency.

The present invention defines flag information indicating a size of a unit block used for a transform process, thereby improving coding efficiency.

The present invention defines flag information indicating a transform type and then uses discrete cosine transform (hereinafter abbreviated DCT) or Karhunen-Loeve transform (hereinafter abbreviated KLT), thereby improving coding efficiency.

The present invention uses DCT or KLT in accordance with a prediction mode of a macro block, thereby improving coding efficiency.

The present invention adaptively uses a size of a unit block used for a transform process in a manner of setting the size equal to or smaller than that of a residual block, thereby improving coding efficiency.

The present invention uses a transform kernel different for each transform block of a macro block coded by an intra prediction mode, thereby improving coding efficiency.

The present invention updates a scanning order for each transform block of a macroblock, thereby improving coding efficiency.

The present invention eliminates redundancy of information indicating whether a non-zero transform coefficient level is included, thereby improving coding efficiency.

If the present inventions are used for an encoding/decoding process based on a macro block greater than 16×16 macroblock, coding efficiency can be further improved.

DESCRIPTION OF DRAWINGS

FIGS. 8A to 8D are diagrams of detailed examples to describe a process for rearranging a scan order for each transform block according to embodiments of the present invention.

BEST MODE FOR INVENTION

Figure 1:
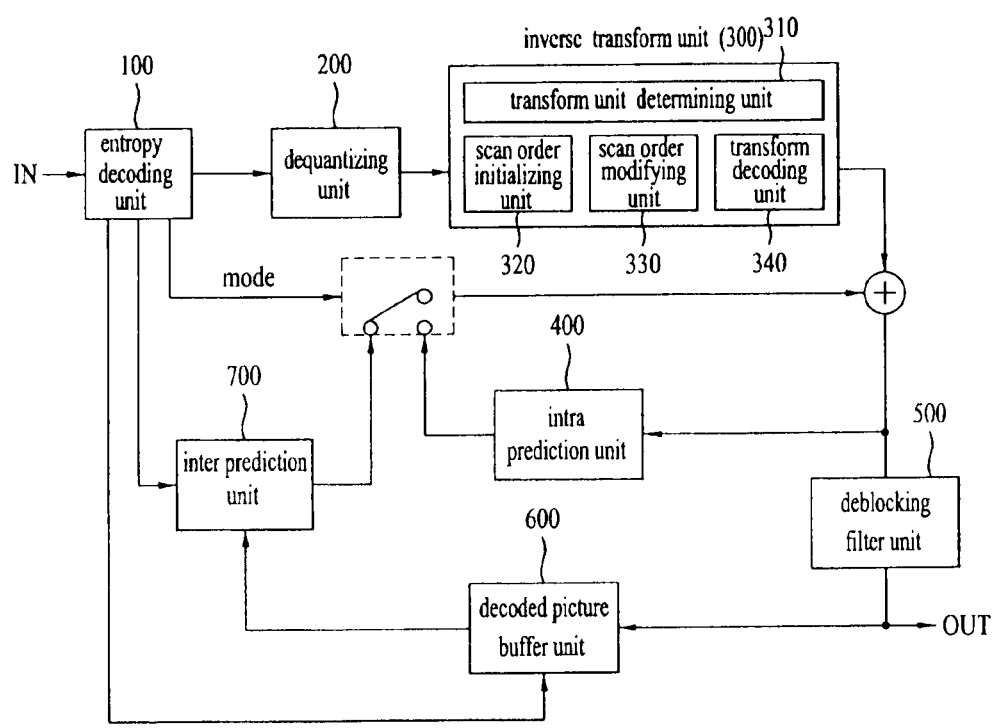
FIG. 1 is a schematic block diagram of a video signal decoding apparatus according to an embodiment of the present invention.

To achieve these and other advantages and in accordance with the purpose of the present invention, as embodied and broadly described, a method of decoding a video signal according to the present invention may include the steps of obtaining a transform size flag of a current macroblock from the video signal, counting the number of non-zero transform coefficients at each pixel position in a $1^{st}$ transform block for the $1^{st}$ transform block corresponding to the transform size flag, modifying a scan order of the $1^{st}$ transform block by prioritizing a position of a pixel having the greatest number of the non-zero transform coefficients in the $1^{st}$ transform block, if the number of non-zero transform coefficients at each pixel position in a $2^{nd}$ transform block is determined, setting the modified scan order of the $1^{St}$ transform block to an initialized scan order of the $2^{nd}$ transform block, modifying a scan order of the $2^{nd}$ transform block in a manner of adding the number of the non-zero transform coefficients at each pixel position in the $1^{st}$ transform block to the number of the non-zero transform coefficients at each pixel position in the $2^{nd}$ transform block and then prioritizing a position of a pixel having the greatest number, and decoding transform coefficients arranged in accordance with the modified scan order, wherein the $1^{st}$ transform block and the $2^{nd}$ transform block have a size corresponding to the transform size flag and is included in the current macroblock.

Preferably, the method may further include the step of obtaining scan order initialization flag information indicating whether to initialize the scan order for each transform block in the current macroblock, wherein if the scan order initialization flag information indicates to initialize the scan order for the each transform block, the initialized scan order of the $2^{nd}$ transform block is set to the modified scan order of the $1^{st}$ transform block.

Preferably, the transform size flag information may include a plurality of transform size flag informations.

More preferably, the transform size flag information may include a $1^{st}$ transform size flag information indicating whether a transform process is performed by 16×16 block unit or a block unit smaller than the 16×16 block unit and a $2^{nd}$ transform size flag information indicating whether the transform process is performed by 8×8 block unit or 4×4 block unit.

In this case, if the $1^{st}$ transform size flag information indicates that the transform process is performed by the block unit smaller than the 16×16 block unit and the $2^{nd}$ transform size flag information indicates that the transform process is performed by the 8×8 block unit, the $1^{st}$ transform block and the $2^{nd}$ transform block may correspond to 8×8 block.

Preferably, the method may further include the step of obtaining a transform type flag information indicating a transform type from the video signal, wherein the transform coefficient decoding step uses discrete cosine transform (DCT) or Karhuhen-Loeve transform (KLT) based on the transform type flag information.

More preferably, if the transform type flag information indicates to use the Karhuhen-Loeve transform (KLT) and the block type of the current macroblock indicates an intra block, the transform coefficient may be decoded using the Karhuhen-Loeve transform (KLT).

To further achieve these and other advantages and in accordance with the purpose of the present invention, an apparatus for decoding a video signal according to the present invention may include an entropy decoding unit obtaining a transform size flag of a current macroblock from the video signal, a $1^{st}$ scan order modifying unit counting the number of non-zero transform coefficients at each pixel position in a $1^{st}$ transform block for the $1^{st}$ transform block corresponding to the transform size flag, the $1^{st}$ scan order modifying unit modifying a scan order of the $1^{st}$ transform block by prioritizing a position of a pixel having the greatest number of the non-zero transform coefficients in the $1^{st}$ transform block, a $2^{nd}$ scan order modifying unit determining the number of non-zero transform coefficients at each pixel position in a $2^{nd}$ transform block, the $2^{nd}$ scan order modifying unit setting the modified scan order of the $1^{st}$ transform block to an initialized scan order of the $2^{nd}$ transform block, the $2^{nd}$ scan order modifying unit modifying a scan order of the $2^{nd}$ transform block in a manner of adding the number of the non-zero transform coefficients at each pixel position in the $1^{st}$ transform block to the number of the non-zero transform coefficients at each pixel position in the $2^{nd}$ transform block and then prioritizing a position of a pixel having the greatest number, and a transform decoding unit decoding transform coefficients arranged in accordance with the modified scan order, wherein the $1^{st}$ transform block and the $2^{nd}$ transform block have a size corresponding to the transform size flag and is included in the current macroblock.

MODE FOR INVENTION

Looking into a bit sequence configuration of a video signal, there exists a separate layer structure called a NAL (network abstraction layer) between a VCL (video coding layer) dealing with a moving picture encoding process itself and a lower system that transports and stores encoded information. An output from an encoding process is VCL data and is mapped by NAL unit prior to transport or storage. Each NAL unit includes compressed video data or RBSP (raw byte sequence payload: result data of moving picture compression) that is the data corresponding to header information.

The NAL unit basically includes two parts, a NAL header and an RBSP. The NAL header includes flag information (nal_ref_idc) indicating whether a slice as a reference picture of the NAL unit is included and an identifier (nal_unit_type) indicating a type of the NAL unit. Compressed original data is stored in the RBSP. And, RBSP trailing bit is added to a last portion of the RBSP to represent a length of the RBSP as an 8-bit multiplication. As the types of the NAL unit, there are IDR (instantaneous decoding refresh) picture, SPS (sequence parameter set), PPS (picture parameter set), SEI (supplemental enhancement information), and the like.

In the standard, requirements for various profiles and levels are set to enable implementation of a target product with an appropriate cost. In this case, a decoder should meet the requirements decided according the corresponding profile and level. Thus, two concepts, 'profile' and 'level' are defined to indicate a function or parameter for representing how far the decoder can cope with a range of a compressed sequence. And, a profile identifier (profile_idc) can identify that a bit stream is based on a prescribed profile. The profile identifier means a flag indicating a profile on which a bit stream is based. For instance, in H.264/AVC, if a profile identifier is 66, it means that a bit stream is based on a baseline profile. If a profile identifier is 77, it means that a bit stream is based on a main profile. If a profile identifier is 88, it means that a bit stream is based on an extended profile. Moreover, the profile identifier may mean an identification information indicating that an inputted bitstream is coded into a data of a specific type. For instance, the profile identifier may indicate a multiview video coded bitstream or a stereo video coded bitstream. Besides, the profile identifier may be included in a sequence parameter set.

Sequence parameter set may indicate header information containing information crossing over encoding of an overall sequence such as a profile, a level, and the like. A whole compressed video, i.e., a sequence should start with a sequence header. Hence, a sequence parameter set corresponding to header information should arrive at a decoder before the data, which will refer to the parameter set, arrives. Namely, the sequence parameter set RBSP plays a role as the header information for the result data of the video compression. Once a bit stream is inputted, a profile identifier preferentially identifies that the inputted bit stream is based on which one of a plurality of profiles.

FIG. 1 is a schematic block diagram of an apparatus for decoding a video signal according to the present invention.

Referring to FIG. 1, the decoding apparatus may include an entropy decoding unit 100, a dequantizing unit 200, an inverse transform unit 300, an intra prediction unit 400, a deblocking filter unit 500, a decoded picture buffer unit 600, an inter prediction unit 700, and the like. And, the inverse transform unit 300 may include a transform size determining unit 310, a scan order initializing unit 320, a scan order modifying unit 330 and a transform decoding unit 340.

First of all, the decoding apparatus may perform parsing by a unit of NAL to decode a received video signal. In general, at least one sequence parameter set and at least one picture parameter set may be transferred to a decoder before a slice header and slice data are decoded. In this case, various kinds of configuration informations may be included in a NAL header region or an extension region of a NAL header.

The entropy decoding unit 100 performs entropy decoding on a parsed bit stream and a coefficient of each macroblock, a motion vector and the like are then extracted. The dequantizing unit 200 obtains a transform coefficient value by multiplying the entropy-decoded data by a predetermined constant and the inverse transform unit 300 then transforms the transform coefficient value inversely to reconstruct a pixel value. In doing so, the transform size determining unit 310 obtains transform size related information and may be then able to determine a transform size. For instance, adaptive transform size flag information, transform size flag information and the like may be obtained. This shall be described in detail with reference to FIG. 2, FIG. 3A and FIG. 3B later. The scan order initializing unit 320 initializes a scan order for the dequantized transform coefficients and the scan order modifying unit 330 modifies or updates the scan order into a scan order suitable for each block based on a count of non-zero transform coefficient(s). The transform decoding unit 340 decodes the transform coefficients based on the modified or updated scan order. Meanwhile, if the count of the transform coefficient values is further decremented through this transform process, an encoding apparatus may be able to raise a compression effect. And, if intra-picture important data are further intensively distributed on some coefficients, the compression effect can be further raised. Therefore, embodiments for this transform process are explained in the description of the present invention.

The intra prediction unit 400 performs intra prediction from a decoded sample within a current picture. The intra prediction unit 400 predicts a current block using pixels of a block neighbor to a current block within the current picture. If the prediction is performed more precisely, coding efficiency can be improved as well as image quality.

Meanwhile, the deblocking filter unit 500 is applied to each coded macroblock to reduce block distortion. A filter may smooth a block edge to enhance an image quality of a decoded frame. Selection of a filtering process depends on a boundary strength and a gradient of an image sample around a boundary. Pictures through filtering are outputted or saved in the decoded picture buffer unit 600 to be used as reference pictures.

The decoded picture buffer unit 600 plays a role in storing or opening the previously coded pictures to perform inter prediction. In doing so, in order to save the pictures in the decoded picture buffer unit 600 or to open the pictures, information 'frame_num' indicating a decoding order of each picture and information 'POC (picture order count)' indicating an output order of picture may be used. The reference pictures managed in the above manner may be used by the inter prediction unit 700.

The inter prediction unit 700 compensates for a motion of a current block using informations transferred from the entropy decoding unit 100. Motion vectors of blocks neighbor to the current block are extracted from a video signal and a motion vector prediction value of the current block is then obtained. And, the motion of the current block is compensated using the obtained motion vector prediction value and a differential vector extracted from the video signal. And, it may be able to perform the motion compensation using one reference picture or a plurality of pictures.

The decoding apparatus may obtain a prediction value (i.e., predictor) generated by inter or intra prediction in accordance with prediction mode information. By adding a residual extracted from the video signal and the obtained prediction value together, it may be able to reconstruct a current picture. In this case, the residual may indicate a different between an original signal and a prediction signal. This signal can have one of a sequence unit, a picture unit, a slice unit, a macroblock unit, a sub-block unit and a pixel unit. In this specification, each of the units can be interpreted as a unit suitable for each decoding process.

The present invention may be used for the processing of a video signal having a further extended resolution. In particular, for the processing of the video signal having the extended resolution, it may be able to define a macroblock of an extended size. For instance, macroblocks of sizes including 32×32, 64×32, 32×64, 64×64 and the like may be usable as well as macroblocks of sizes including 16×16, 16×8, 8×16, 8×8, 8×4, 4×8 and 4×4. A size of a macroblock may be determined adaptively in accordance with resolution of a video signal. For instance, if resolution of a video signal is equal to or smaller than VGA (e.g., 640×480, 4:3), a macroblock of 16×16 size may be usable. If resolution of a video signal is equal to or greater than VGA and equal to or smaller than 1080P, a macroblock of 32×32 size may be usable. If resolution of a video signal is equal to or greater than 1080P and equal to or smaller than 4 k×2 k, a macroblock of 64×64 size may be usable.

Figure 2:
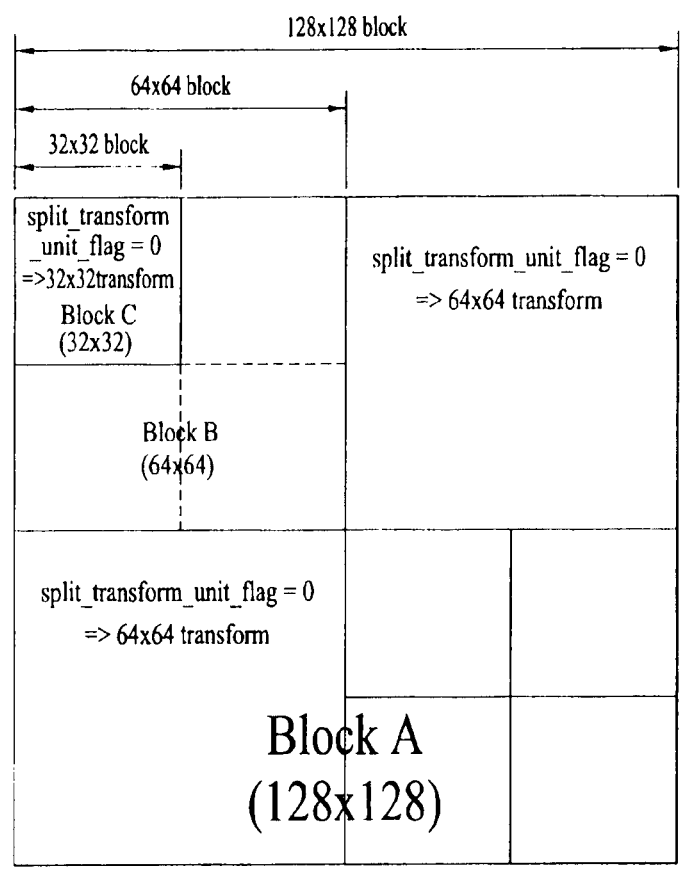
FIGS. 2 to 3B are diagrams of a process for determining a size of a unit block used for a transform process based on flag information according to embodiments of the present invention.
Figure 3A:
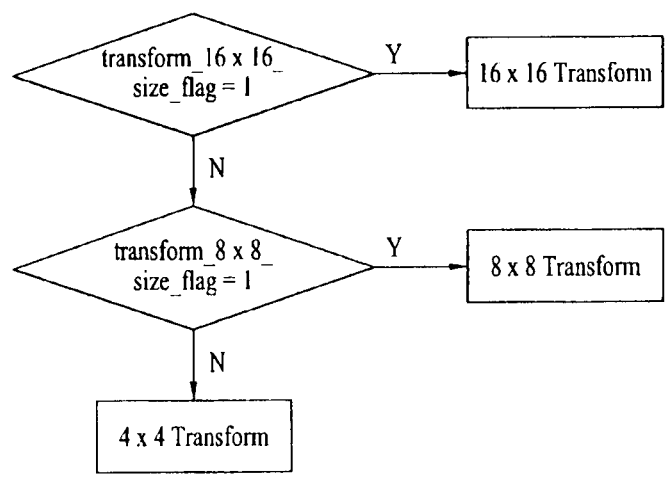
Figure 3B:
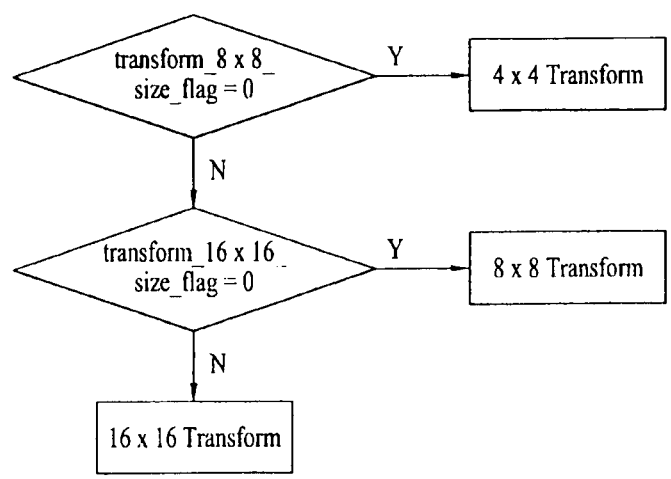

FIGS. 2 to 3B are diagrams of a process for determining a size of a unit block used for a transform process based on flag information according to embodiments of the present invention.

First of all, transform schemes used for an encoding/decoding apparatus may include a block based transform scheme and an image based transform scheme. The block based transform scheme may include one of discrete cosine transform (hereinafter abbreviated DCT), Karhuhen-Loeve transform (hereinafter abbreviated KLT) and the like. In this case, the discrete cosine transform (DCT) means that a signal in spatial domain is resolved (or transformed) into 2-dimensiaonl frequency components. A frequency component gets lower toward a left top side within a block or gets higher toward a right bottom size within the block, thereby forming a prescribed pattern within the block. For instance, one frequency component situated at a most left top side among 64 2-dimensional frequency components is a component having a frequency set to 0 as a direct current (DC) component and the rest of the 2-dimensional frequency components are AC (alternate current) components including 63 frequency components ranging from a low frequency component to a high frequency component. If the discrete cosine transform (DCT) is performed, it may mean that a size of each of base components (64 basic pattern components) included in a block of an original video signal is found. And, this size becomes a discrete cosine component coefficient.

The discrete cosine transform (DCT) is the transform simply used for the representation with an original video signal component, by which a frequency component can be completely reconstructed into an original video signal in case of inverse transform. Namely, by changing a video representing method only, all information included in an original video can be kept as well as redundant information. If the discrete cosine transform (DCT) is performed on an original video, a discrete cosine transform (DCT) coefficient exists in a manner of gathering into a value near 0. Using this property, it may be able to obtain a high compression effect.

Meanwhile, the Karhuhen-Loeve transform (KLT) is one of schemes for processing data in a manner of reducing dimensions into lower dimension(s) (e.g., K dimensions) for data consisting of feature vectors of poly-dimensions (e.g., K dimensions) by maintaining original information to the maximum. In particular, unique components indicating features of data well are extracted and values having high feature components are taken from the extracted components, whereby dimensions can be reduced and the difference from the original information can be minimized. For instance, the Karhuhen-Loeve transform (KLT) scheme may be usable in accordance with a prediction mode used for encoding or decoding of an intra block. A scanning order scheme is applied differently in accordance with the prediction mode, whereby coding efficiency can be raised.

According to one embodiment of the present invention, a size of a unit block (hereinafter named a transform size) used for a transform process for one macroblock may be adaptively set. For instance, in case of processing a video signal having high resolution, a transform size may be determined to be suitable for the resolution of the video signal. In particular, when 32×32 macroblock is used for a video signal having resolution of XGA (extended graphics array: 1024× 768 or 4:3), a transform size may be set to 16×16. In this case, a transform process may be performed on 32×32 block using 16×16 transform size only. Alternatively, a transform process may be performed using at least one transform size selected from the group including 32×32, 32×16, 16×32, 16×16, 16×8, 8×16, 8×8, 8×4, 4×8, and 4×4. In particular, a single transform size may be usable for one macroblock or a plurality of transform sizes may be usable for one macroblock.

The present invention may be able to define adaptive transform size flag information that enables a setting of a transform size suitable for each block. In this case, the adaptive transform size flag information may be defined as information indicating whether a coding unit is partitioned in to coding units each of which has a half size in horizontal and vertical directions. In this case, the coding unit may mean one of a picture, a slice, a macroblock, a sub-block, a transform block, a block, a pixel and the like. Namely, if the adaptive transform size flag information of a $1^{st}$ coding unit is true, the adaptive transform size flag information can be obtained for each $2^{nd}$ coding unit. In this case, the $2^{nd}$ coding unit may indicate a sub-block included in the $1^{st}$ coding unit. The adaptive transform size flag information may be obtained by the transform unit or the inverse transform unit 300, and more particularly, by the transform size determining unit 310. The adaptive transform size flag information may be obtained in a manner of comparing a size of a current transform unit to at least one of a minimum transform size and a maximum transform size. For instance, if a size of a current transform unit is greater than a minimum transform size and equal to or smaller than a maximum transform size, the adaptive transform size flag information can be obtained. Based on the adaptive transform size flag information, a size of a transform unit may be determined and a transform process may be then performed correspondingly. Alternatively, based on the adaptive transform size flag information, coded block flag information (coded_block_flag) may be obtained. In this case, the coded block flag information (coded_block_flag) may indicate whether a transform unit includes a non-zero transform coefficient level.

For instance, if a size of the $1^{st}$ coding unit is 128×128, the $2^{nd}$ coding unit can indicate 4 sub-blocks each of which has 64×64 size. If the adaptive transform size flag information does not exist, it may be able to derive the adaptive transform size flag information in a manner of comparing a transform size of a current block with a minimum transform size. For instance, if a transform size of a current block is greater than a minimum transform size, it may indicate that the coding unit is partitioned into coding units each of which has a half size. It a transform size of a current block is not greater than a minimum transform size, the adaptive transform size flag information may indicate that a coding unit is not partitioned into coding units each of which has a half size in horizontal and vertical directions. In particular, if a transform size of a current block is greater than a minimum transform size, the adaptive transform size flag information is derived into '1' to check the adaptive transform size flag information for each sub-block. If a transform size of a current block is not greater than a minimum transform size, the adaptive transform size flag information is derived into '0' to apply the transform size of the current block.

For example, assume that the adaptive transform size flag information is set to split transform unit flag. Referring to FIG. 2, if a size of a current macroblock (Block A) is 128×128, it may be able to select at least one from 128×128, 64×64, 32×32, 16×16, 8×8 and 4×4 transform sizes in accordance with the split_transform_unit_flag. The split_transform_unit_flag is extracted at a current macroblock (Block A) level. If the split_transform_unit_flag indicates a value set to 0, the 128×128 transform size is applied. If the split_transform_unit_flag indicates a value set to 1, it may be able to obtain the split_transform_unit_flag for each of four 64×64 sub-blocks in the current 128×128 macroblock.

If the split_transform_unit_flag obtained at 64×64 sub-block (block B) level indicates a value set to 0, 64×64 transform size is applied. If the split_transform_unit_flag indicates a value set to 1, it may be able to obtain the split_transform_unit_flag again for each of four 32×32 sub-blocks in the 64×64 macroblock. Likewise, the above-described process may be identically applicable to sub-blocks in the following.

The present invention may be able to define flag information indicating the transform size. For instance, referring to FIG. 3A and FIG. 3B, one of 16×16, 8×8 and 4×4 transforms sizes may be selected in accordance with transform_16×16_size_flag or transform_8×8_size_flag. In this case, the transform_16×16_size_flag indicates whether a transform process is performed by 16×16 block unit or a block unit smaller than the 16×16 block unit. And, the transform_16×16_size_flag can be obtained at a macroblock level. The transform_8×8_size_flag indicates whether a transform process is performed by 8×8 block unit or 4×4 block unit and can be obtained at a sub-macroblock level. Referring to FIG. 3A, if the transform_16×16_size_flag indicates 1, a transform process may be performed by 16×16 block unit. If the transform_16×16_size_flag indicates 0, the transform_8×8_size_flag is checked. If the transform_8×8_size_flag indicates 1, a transform process may be performed by 8×8 block unit. If the transform_8×8_size_flag indicates 0, a transform process may be performed by 4×4 block unit.

Likewise, referring to FIG. 3B, if the transform_8×8_size_flag indicates 0, a transform process may be performed by 4×4 block unit. If the transform_8×8_size_flag indicates 1, the transform_16×16_size_flag is checked. If the transform_16×16_size_flag indicates 1, a transform process may be performed by 16×16 block unit. If the transform_16×16_size_flag indicates 0, a transform process may be performed by 8×8 block unit.

According to another embodiment of the present invention, in case that a transform size available in accordance with a size of macroblock is set in advance, a decoding apparatus may be able to derive flag information indicating the transform size from itself instead of receiving the flag information. For instance, assuming that 8×8 transform size is not used when a size of macroblock is 32×32, if transform 8×8 size flag indicates 0, a transform process may be performed by 4×4 block unit. If the transform_8×8 size_flag indicates 1, a transform process may be performed by 16×16 block unit. In this case, transform 16×16 size_flag may be derived into 1. Likewise, when a size of macroblock is 8×8, if transform_8×8_size_flag indicates 0, a transform process may be performed by 4×4 block unit. If the transform_8×8_size_flag indicates 1, a transform process may be performed by 16×16 block unit. In this case, transform_16×16_size_flag may be derived into 0.

According to another embodiment, assuming that 8×8 transform size is used for 8×8 block only, transform_16×16_size_flag is transmitted only to identify intra 8×8 block and intra 16×16 block from each other. And, transform_8×8_size_flag may be derived into 1 by a decoding apparatus. Moreover, assuming that 4×4 transform size is used for 8×8 block only, transform_16×16_size_flag is transmitted only to identify intra 8×8 block and intra 16×16 block from each other. And, transform_8×8_size_flag may be derived into 0 or 1 by a decoding apparatus in accordance with a sub-macroblock type.

As mentioned in the above description, a transform size, a macroblock size, flag information indicating a transform size and the like are just exemplary. And, 32×32, 32×16, 16×32, 16×16, 16×8, 8×16, 8×8, 8×4, 4×8, 4×4 and sizes over 32×32 may be applicable all. Combination of 2 flag informations in FIG. 2, FIG. 3A and FIG. 3B corresponds to one embodiment. A transform size may be indicated by one flag information. And, various embodiments may be set by combining a plurality of flag informations together.

Figure 4:
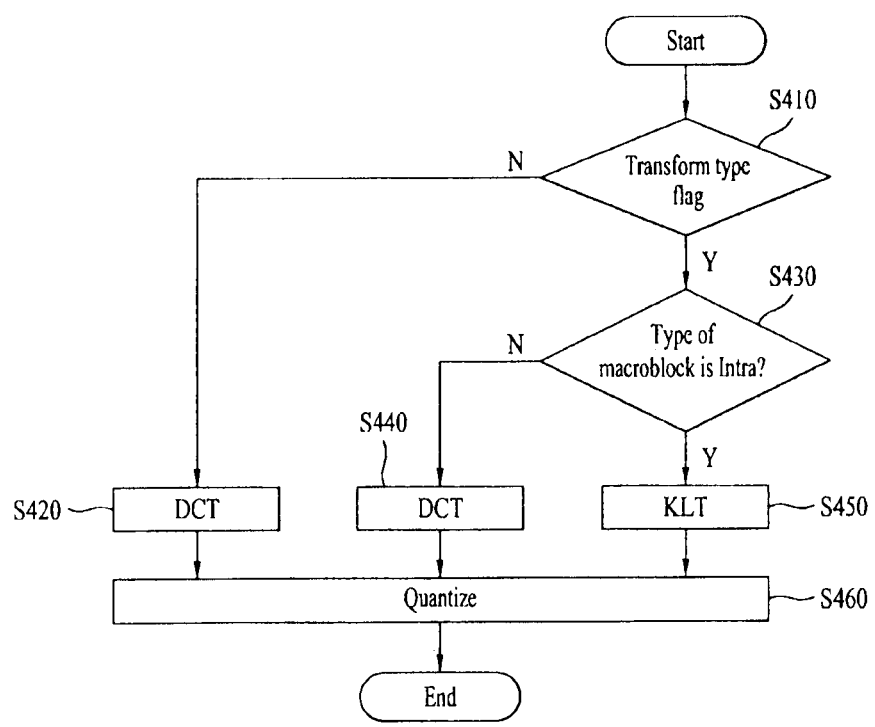
FIG. 4 is a flowchart to describe a process for determining a transform scheme (DCT or KLT) based on a flag indicating a transform type or a prediction mode of a macroblock according to an embodiment of the present invention.

FIG. 4 is a flowchart to describe a process for determining a transform scheme (DCT or KLT) based on a flag indicating a transform type or a prediction mode of a macroblock according to an embodiment of the present invention.

As mentioned in the foregoing description with reference to FIG. 2, FIG. 3A and FIG. 3B, various transform schemes (e.g., DCT, KLT, etc.) may be applicable in case of processing a video signal for coding efficiency improvement. For instance, an encoding apparatus may be able to determine a transform scheme for rate-distortion optimization by applying DCT, KLT or the like to each slice. The determined transform scheme may be coded as a syntax element and transmitted. And, the determined transform scheme may be defined in a macroblock layer, a slice header or a picture parameter set information. For detailed example, an encoding apparatus applies DCT to a slice, calculates a rate-distortion (RD) cost, applies KLT, and then calculates a rate-distortion (RD) cost. If the RD cost of KLT is less than the RD cost of DCT, the KLT may be selected as a transform scheme for the slice. The encoding apparatus codes it into syntax element and then transmits it. In this case, the syntax element may mean the flag information indicating a transform type.

For instance, referring to FIG. 4, a transform type flag information indicating a transform type is obtained [S410]. If the transform type flag information (transform_type_flag) indicates 0, DCT is applied [S420]. If the transform type flag information indicates 1, DCT or KLT may be applied based on a type of macroblock [S430]. If the type of macroblock indicates an intra block, KLT is applied [S450]. If the type of macroblock is not the intra block, DCT may be applied [S440]. A quantizing process is then performed on the data transformed in the above manner [S460]. Thus, according to the present invention, a transform scheme suitable for each prediction mode is usable based on a prediction ode of macroblock.

Figure 5:
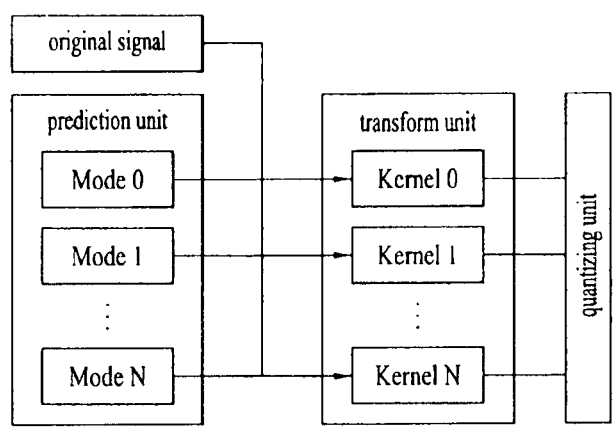
FIG. 5 is a schematic block diagram to describe a new mode dependent directional transform for applying a different transform kernel in accordance with a position of a transform block according to an embodiment of the present invention.

FIG. 5 is a schematic block diagram to describe a new mode dependent directional transform for applying a different transform kernel in accordance with a position of a transform block according to an embodiment of the present invention.

First of all, a mode dependent directional transform means a technique for improving coding efficiency in a manner of using a KLT dependent transform scheme in accordance with a prediction mode used for intra block coding and applying a scanning order differently in accordance with each prediction mode. Referring to FIG. 5, a prediction unit transmits a prediction signal in accordance with each mode. A transform unit receives a residual signal indicating a difference between an original signal and the prediction signal and then generates a transform coefficient by transforming the residual signal. In doing so, the transform unit may apply a separate transform kernel to a residual signal in accordance with each mode. Thus, transform coefficients generated in accordance with the respective prediction modes are quantized by a quantizing unit. Moreover, the mode dependent directional transform may be able to use a transform kernel for a horizontal transform and a transform kernel for a vertical transform separately.

Figure 6:
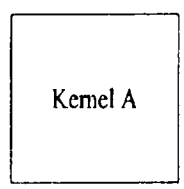
FIG. 6 is a diagram of a detailed example using a different transform kernel in accordance with a position of a transform block according to an embodiment of the present invention.

FIG. 6 is a diagram of a detailed example using a different transform kernel in accordance with a position of a transform block according to an embodiment of the present invention.

According to an embodiment of the present invention, a transform size may be equal to or smaller than a size of a prediction block. For instance, in case of 32×32 block, a transform size may correspond to one of 32×32, 16×16, 8×8, and 4×4. In case of 16×16 block, a transform size may correspond to one of 16×16, 8×8, and 4×4. In case of 8×8 block, a transform size may correspond to one of 8×8 and 4×4. In case of 4×4 block, a transform size may correspond to 4×4 only.

In case that a transform size 8×8 is applied to 16×16 block, the same transform kernel may be applied to 4 transform blocks. Alternatively, referring to FIG. 6, it may be able to apply a transform kernel different in accordance with a position of each transform block. In this case, 4 transform kernels may be necessary.

Figure 7:
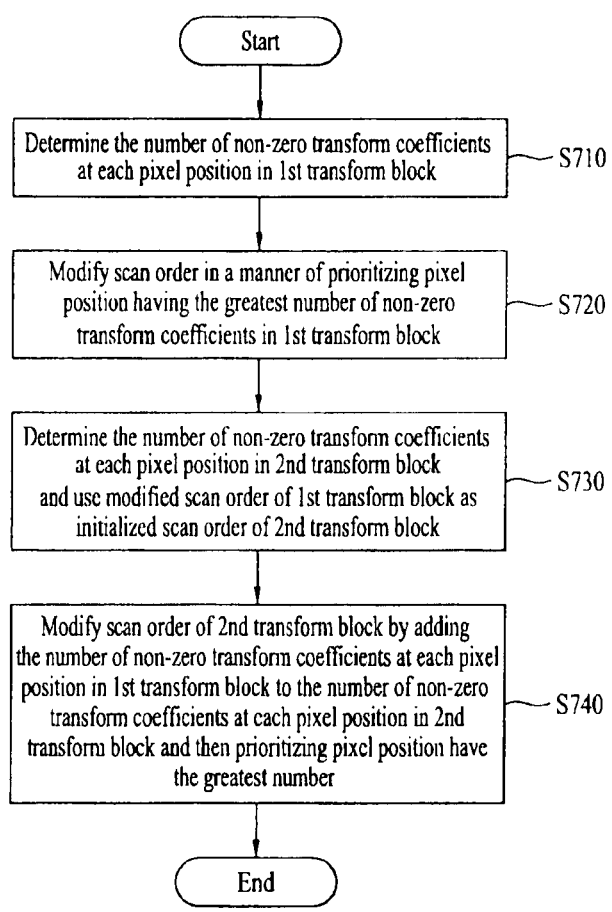
FIG. 7 is a flowchart to describe a process for rearranging a scan order for each transform block according to an embodiment of the present invention.

FIG. 7 is a flowchart to describe a process for rearranging a scan order for each transform block according to an embodiment of the present invention.

First of all, a scan order means an order for arranging transform coefficients in 1-dimensional form. In particular, a coefficient of a lower frequency is situated at a front side, while a coefficient of a higher frequency is situated at a rear side. A transform coefficient decoding process may be applicable to 4×4 luminance residual block, 8×8 luminance residual block, luminance sample of intra 16×16 prediction mode, chrominance sample and the like. Moreover, as mentioned in the foregoing description, if a transform size is gent bigger, a target block or sample may increase correspondingly. For instance, a transform coefficient decoding process may be applicable to 16×16 luminance residual block, 32×32 luminance residual block, luminance sample of intra 32×32 prediction mode, chrominance sample and the like.

For example, in accordance with the transform_16×16_size_flag and transform_8×8_size_flag described with reference to FIG. 3A and FIG. 3B, if the flag informations indicate to perform a transform process by 16×16 block unit, a transform coefficient decoding process may be applicable to 16×16 luminance residual block. For another example, if the flag informations indicate to perform a transform process by 8×8 block unit, a transform coefficient decoding process may be applicable to 8×8 luminance residual block.

According to one embodiment of the present invention, if a transform coefficient decoding process is applied to 8×8 luminance residual block, 64 values within the 8×8 luminance residual block are preferentially set to initial value according to a scan order. In this case, the 64 initial values may indicate transform coefficients and the scan order may mean a zigzag scan. If the transform coefficients are rearranged in accordance with a modified scan order, it may be able to decrement the number of bits in case of run-length coding. In this case, the modified scan order may mean that a pixel position having a greatest number of non-zero transform coefficients is set to a priority after calculating the number of the non-zero transform coefficients. In particular, the number of the non-zero transform coefficients may be updated by being calculated for each macroblock or each transform block.

For instance, referring to FIG. 7, the number of non-zero transform coefficients is counted at each pixel position in a $1^{st}$ transform block within a macroblock [S710]. Subsequently, a scan order may be modified in a manner that a pixel position having the greatest number of non-zero transform coefficients among pixel positions in the $1^{st}$ transform block is prioritized [S720]. Subsequently, the number of non-zero transform coefficients is determined at each pixel position in a $2^{nd}$ transform block and the modified scan order of the $1^{st}$ transform block may be used as an initialized scan order of the $2^{nd}$ transform block [S730]. In this case, each of the $1^{St}$ and $2^{nd}$ transform blocks indicates the block partitioned in one macroblock. For instance, if a current macroblock is 8×8 macroblock and a transform coefficient decoding process is applied by 4×4 luminance residual block unit within the current macroblock, a left top 4×4 block, a right top 4×4 block, a left bottom 4×4 block and a right bottom 4×4 block may be defined as a $1^{st}$ transform block, a $2^{nd}$ transform block, a $3^{rd}$ transform block and a $4^{th}$ transform block, respectively. Such an order of sub-blocks may be non-limited by the present embodiment. Subsequently, it may be able to modify a scan order of the $2^{nd}$ transform block in a manner of adding the number of the non-zero transform coefficients at each pixel position in the $1^{st}$ transform block and the number of the non-zero transform coefficients at each pixel position within the $2^{nd}$ transform block and then prioritizing the pixel position having the greatest number [S740]. Thus, through the scan order updating process, coding efficiency can be improved. And, corresponding examples shall be described in detail with reference to FIGS. 8A to 8D later.

The scan order updating process may be performed for each macroblock, each transform block or each block. After the scan order updating process has been completed, initialization of the scan order is performed. For this, flag information may be defined. For instance, if scan order initialization flag information indicates 1, a scan order is initialized for each macroblock or each transform block. If the scan order initialization flag information indicates 0, the scan order updating process is performed again.

FIGS. 8A to 8D are diagrams of detailed examples to describe a process for rearranging a scan order for each transform block according to embodiments of the present invention.

According to the present embodiment, if a current macroblock is 32×32 macroblock and a transform coefficient decoding process is applied by 16×16 block unit within a current macroblock, a left top 16×16 block, a right top 16×16 block, a left bottom 16×16 block and a right bottom 16×16 block may be defined as a $1^{st}$ block, a $2^{nd}$ block, a $3^{rd}$ block and a $4^{th}$ block, respectively. In this case, each of the $1^{st}$ to $4^{th}$ blocks may mean a transform block. A gray block indicates that a non-zero transform coefficient is included. And, a numeral within the gray block indicates a scan order.

Referring to FIG. 8A, if non-zero transform coefficients are preferentially counted within a $1^{st}$ block, it can be recognized that the non-zero transform coefficients exist in total 4 gray pixels. An initialized scan order follows a zigzag scan order. In this case, the initialized scan order may be non-limited by the zigzag scan order. In case of applying the zigzag scan order with reference to the non-zero transform coefficient existing gray pixel, it may be able to obtain an updated scan order as shown in FIG. 8A.

Referring to FIG. 8B, non-zero transform coefficients are preferentially counted within a $2^{nd}$ block. This counted number is added to the number of the non-zero transform coefficients in the $1^{st}$ block to count the number of the finally cumulative non-zero transform coefficients. As an initialized scan order of the $2^{nd}$ block, the finally updated scan order in the $1^{st}$ block is used. Likewise, it may be able to modify a scan order in a manner of prioritizing a pixel position having the greatest number among the numbers of the finally cumulative non-zero transform coefficients.

Referring to FIG. 8C, non-zero transform coefficients are preferentially counted within a $3^{rd}$ block. This counted number is added to the number of the non-zero transform coefficients in the $2^{nd}$ block to count the number of the finally cumulative non-zero transform coefficients. As an initialized scan order of the $3^{rd}$ block, the finally updated scan order in the $2^{nd}$ block is used. Likewise, it may be able to modify a scan order in a manner of prioritizing a pixel position having the greatest number among the numbers of the finally cumulative non-zero transform coefficients.

Likewise, referring to FIG. 8D, non-zero transform coefficients are preferentially counted within a $4^{th}$ block. This counted number is added to the number of the non-zero transform coefficients in the $3^{rd}$ block to count the number of the finally cumulative non-zero transform coefficients. As an initialized scan order of the $4^{th}$ block, the finally updated scan order in the $3^{rd}$ block is used. Likewise, it may be able to modify a scan order in a manner of prioritizing a pixel position having the greatest number among the numbers of the finally cumulative non-zero transform coefficients.

Thus, by updating a san order for each sub-block, coding efficiency can be further improved. Instead of initializing a scan order for each slice, flag information indicating whether a scan order is re-initialized can be defined in a slice header.

Thus, the transform coefficients arranged 1-dimensionally are decoded in accordance with an updated scan order.

Meanwhile, as mentioned in the foregoing description with reference to FIG. 2, FIG. 3A and FIG. 3B, in case of processing a video signal of high resolution, a transform size may be determined to be suitable for the resolution of the video signal. In doing so, it may be necessary to prevent a redundant transmission of informations indicating whether a non-zero transform coefficient level is included. For instance, coded block flag information (coded_block_flag) indicates whether a non-zero transform coefficient level is included. If the coded block flag information (coded_block_flag) is set to 0, it indicates that the non-zero transform coefficient level is not included. If the coded block flag information (coded_block_flag) is set to 1, it indicates that at least one non-zero transform coefficient level is included. As another flag information, block pattern information (coded_block_pattern) indicates whether four 8×8 luminance blocks and chrominance blocks related to the luminance blocks include non-zero transform coefficient level. The block pattern information (coded_block_pattern) is extracted from a macroblock layer if a prediction mode of a current macroblock is not 16×16 prediction mode. In this case, the block pattern information is a sort of a representative bit flag indicating a presence or non-presence of a residual and may be able to indicate a residual presence or non-presence of 16×16, 8×8 or 4×4 luminance block. For instance, if a current macroblock is present, the current macroblock is partitioned into 4 equal parts. A let top block, a right top block, a left bottom block and a right bottom block are then set to $0^{th}$ bit, $1^{st}$ bit, $2^{nd}$ bit and $3^{rd}$ bit, respectively. Hence, it may be able to represent a presence or non-presence of a residual for each block. The block pattern information is represented as bits. As mentioned in the foregoing description, a luminance block is represented as $0^{th}$ to $3^{rd}$ bit, while a chrominance block is represented a 2 bits (AC and DC).

For instance, when a size of a current block is 16×16, if a transform coefficient decoding process is applied by 16×16 block unit, a luminance component of the block pattern information (coded block pattern) is reduced into 1 hit and the coded block flag information (coded_block_flag) may not be transmitted. For another instance, when a size of a current block is 16×16, if a transform coefficient decoding process is applied by 16×8/8×16 block unit, a luminance component of the block pattern information (coded_block_pattern) is reduced into 2 bits and the coded block flag information (coded_block_flag) may not be transmitted. For another instance, when a size of a current block is 32×32, if a transform coefficient decoding process is applied by 16×16 block unit, a luminance component of the block pattern information (coded_block_pattern) uses 4 bits and the coded block flag information (coded_block_flag) may not be transmitted.

Meanwhile, the coded block flag information (coded_block_flag) may be obtained based on adaptive transform size flag information, which is described in detail with reference to FIG. 2. The adaptive transform size flag information may be obtained in a manner of comparing a size of a current transform unit to at least one of a minimum transform size and a maximum transform size. If the adaptive transform size flag information indicates that a coding unit is partitioned into coding units each of which has a half size in horizontal and vertical directions, a size of a transform unit is determined and a transform processing may be correspondingly performed. If the adaptive transform size flag information indicates that a coding unit is not partitioned into coding units each of which has a half size in horizontal and vertical directions, the coded block flag information (coded_block_flag) may be obtained.

As mentioned in the foregoing description, a decoding/encoding apparatus according to the present invention may be provided to a transmitter/receiver for multimedia broadcasting such as DMB (digital multimedia broadcast) to be used in decoding video signals, data signals and the like. And, the multimedia broadcast transmitter/receiver may include a mobile communication terminal.

A decoding/encoding method according to the present invention may be configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording medium may include one of ROM, RAM, CD-ROM, magnetic tapes, floppy discs, optical data storage devices and the like and may be implemented with carrier waves (e.g., transmission via internet). And, a bit stream generated by the encoding method may be saved in a computer-readable recording medium or transmitted via wire/wireless communication network.

INDUSTRIAL APPLICABILITY

Accordingly, while the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:
1. A method for decoding a video signal by a decoding apparatus, the method comprising:
obtaining, by the decoding apparatus, split indication information for a transform block from the video signal based on a specific condition being satisfied, the split indication information indicating whether the transform block is split into four transform sub-blocks, each transform sub-block having a half horizontal size and a half vertical size of the transform block;

based on the split indication information for the transform block having a first value, partitioning, by the decoding apparatus, the transform block into the four transform sub-blocks; and based on the split indication information for the transform block having a second value, obtaining, by the decoding apparatus, coded block flag information for the transform block from the video signal, the coded block flag information for the transform block indicating whether the transform block includes one or more transform coefficient information not equal to 0, and obtaining, by the decoding apparatus, a residual signal based on the coded block flag information for the transform block, wherein the specific condition includes:
a current size of the transform block being less than or equal to a maximum transform size, and
the current size of the transform block being greater than a minimum transform size, and wherein, based on the split indication information having the first value, for each of the four transform sub-blocks, the decoding apparatus repeats a procedure comprising:

obtaining, by the decoding apparatus, split indication information for a transform sub-block from the video signal, based on the split indication information for the transform sub-block having the first value, partitioning, by the decoding apparatus, the transform sub-block into four transform sub-sub-blocks, and based on the split indication information for the transform sub-block having the second value, obtaining coded block flag information for the transform sub-block from the video signal, the coded block flag information for the transform sub-block indicating whether the transform sub-block includes one or more transform coefficient information not equal to 0, and obtaining, by the decoding apparatus, a residual signal based on the coded block flag information for the transform sub-block.

2. The method according to claim 1, wherein the maximum transform size is 32×32 and the minimum transform size is 4×4.

3. The method according to claim 1, wherein obtaining the residual signal includes obtaining transform coefficient information from the video signal, and performing a transform operation on the obtained transform coefficient information.

4. The method according to claim 1, wherein, based on the current size of the transform block being less than or equal to the minimum transform size, the split indication information is derived to have the second value.

5. The method according to claim 3, wherein the transform operation includes a discrete cosine transform.

6. An apparatus for decoding a video signal, the apparatus comprising:
a transform size determining unit configured to obtain split indication information for a transform block from the video signal based on a specific condition being satisfied, the split indication information indicating whether the transform block is split into four transform sub-blocks, each transform sub-block having a half horizontal size and a half vertical size of the transform block, and to partition the transform block into the four transform sub-blocks based on the split indication information for the transform block having a first value; and a transform decoding unit configured to, based on the split indication information for the transform block having a second value, obtain coded block flag information for the transform block from the video signal, the coded block flag information for the transform block indicating whether the transform block includes one or more transform coefficient information not equal to 0, and obtain a residual signal based on the coded block flag information for the transform block, wherein the specific condition includes:
a current size of the transform block being less than or equal to a maximum transform size, and
the current size of the transform block being greater than a minimum transform size, and wherein the transform size determining unit is further configured to, based on the split indication information having the first value, for each of the four transform sub-blocks, obtain split indication information for a transform sub-block from the video signal, and based on the split indication information for the transform sub-block having the first value, partition the transform sub-block into four transform sub-sub-blocks, and wherein the transform decoding unit is further configured to, based on the split indication information for the transform sub-block having the second value, obtain coded block flag information for the transform sub-block from the video signal, the coded block flag information for the transform sub-block indicating whether the transform sub-block includes one or more transform coefficient information not equal to 0, and obtain a residual signal based on the coded block flag information for the transform sub-block.

7. The apparatus according to claim 6, wherein the maximum transform size is 32×32 and the minimum transform size is 4×4.

8. The apparatus according to claim 6, wherein obtaining the residual signal includes obtaining transform coefficient information from the video signal, and performing a transform operation on the obtained transform coefficient information.

9. The apparatus according to claim 6, wherein based on the current size of the transform block being less than or equal to the minimum transform size, the split indication information is derived to have the second value.

10. The apparatus according to claim 8, wherein the transform operation includes a discrete cosine transform.

* * * * *